United States Patent [19]

Thorne

[11] Patent Number: 5,027,349
[45] Date of Patent: Jun. 25, 1991

[54] EMBEDDED CONTROL TECHNIQUE FOR DISTRIBUTED CONTROL SYSTEMS

[75] Inventor: Hal A. Thorne, Wendell, N.C.
[73] Assignee: Alcatel NA, Hickory, N.C.
[21] Appl. No.: 547,383
[22] Filed: Jul. 3, 1990

Related U.S. Application Data

[63] Continuation of Ser. No. 349,716, May 10, 1989, abandoned.
[51] Int. Cl.$^5$ .............................................. H04J 3/24
[52] U.S. Cl. ................................. 370/85.1; 370/58.1; 370/85.5; 370/110.1
[58] Field of Search ..................... 370/58.1, 85.1, 85.5

[56] References Cited

U.S. PATENT DOCUMENTS

| | | | |
|---|---|---|---|
| 4,703,478 | 10/1987 | Haselton et al. | 370/94.1 |
| 4,715,031 | 12/1987 | Crawford et al. | 370/94.1 |
| 4,819,228 | 4/1989 | Baran et al. | 370/94 |

Primary Examiner—Douglas W. Olms
Assistant Examiner—Christopher O. Edwards
Attorney, Agent, or Firm—Peter C. Van Der Sluys

[57] ABSTRACT

A control method and apparatus for an electronic system having a plurality of functional elements, both intelligent and non-intelligent, interconnected by a plurality of time-division multiplexed serial data links, wherein information is normally conveyed in time slots on the data links. Control information is exchanged between the elements by using one or more of said time slots as control channels for all control information. The format of the control information is compatible with both the intelligent elements and non-intelligent elements. The control information format includes a plurality of bits for providing command data, a plurality of address bits, a valid bit to indicate that the information being transmitted is a valid message, an interrupt bit to signal a microprocessor in an intelligent device to interrupt and service the message, and a parity bit for error checking.

26 Claims, 2 Drawing Sheets

EMBEDDED CONTROL TECHNIQUE FOR DISTRIBUTED CONTROL SYSTEMS

This is a continuation of co-pending application Ser. No. 07/349,716 filed on May 10, 1989 now abandoned.

BACKGROUND OF THE INVENTION

1. Field of the Invention

The present invention relates to distributed control systems and more particularly to a control technique wherein control information is embedded in the information that is communicated between elements of a system.

2. Description of the Prior Art

The trend in modern telephony equipment designs has been to incorporate microprocessors as system control elements. In most cases, such equipment must support numerous replicated elements which provide standard telephony services or interface standard telephony signals such as DS1. Such elements are often designed to minimize cost due to the impact of replication and system cost. As a result, these elements are often designed as non-intelligent elements having simple, register-oriented control (ROC) interfaces; and which must be controlled by a common control element whose cost can then be effectively distributed across the replicated elements.

A distributed control system architecture may use multiple, distributed microprocessors (control elements) which must communicate with one another and with ROC interfaces in order to co-ordinate system operations. These intelligent control elements often communicate with each other using higher-level, message-oriented control (MOC). A challenging aspect of such architectures is to provide a mechanism for controlling the numerous distributed elements, both intelligence and non-intelligent, in a flexible, but cost-effective, manner.

Non-intelligent elements which employ ROC must receive control information from an intelligent control element. The non-intelligent element normally responds to control information immediately upon reception thereof. Non-intelligent elements also produce information which must be read and acted upon by the control element. This information may fall into one of two categories: urgent information which must be acted upon quickly, and other information which may be referenced on an as-needed basis or periodically scanned at an appropriate rate.

Intelligent elements which communicate via MOC typically send messages in order to report significant system events. Since the information carried in messages may be urgent in nature, the receiving control element must be notified upon arrival of a message in order to promptly initiate message interpretation. Also, since the number and frequency of messages handled may be large, it is often important to minimize the burden of message transmission and reception on the control elements.

A common method of implementing MOC is by using commercially available Data Link Control devices. These devices are both costly and bulky, and separate devices, or a separate channel of a multi-channeled device, must be dedicated to each full duplex MOC channel. Each such device requires interface circuitry to synchronize its transmission and reception. Also, a Direct Memory Access (DMA) controller for each channel is usually needed to free the control element from handling each individual message character. While this technique may be acceptable for a small number of interconnected intelligent system elements, the cost and physical space required may become prohibitive in systems having a large number of elements.

For non-intelligent ROC elements, there are a myriad of techniques for implementing ROC, each one of which is typically customized and optimized to the type of element being controlled. In most cases where both ROC and MOC are present, the ROC technique is different and more primitive than the MOC technique. It is often required that the control element explicitly request information from the controlled element when needed. If information is needed frequently in a system with many replicated elements, the repetitious request/response dialogue may represent a significant overhead to the control element.

SUMMARY OF THE INVENTION

The present invention will be described in the context of a telephone system. However, it should be noted that its application is general enough to be extended to any distributed control system architecture. In the following discussion, the term 'element' or 'system element' will be used as a generalized reference to a sub-unit of a complete system such as an individual printed circuit board assembly. The term 'control element' refers to a system element which contains a controlling entity such as a microprocessor.

In telephone systems, system elements are commonly interconnected by means of serial data paths which carry multiplexed voice and/or data information. Since this network of data paths must exist to transport voice/data information among the elements of the system, it is desirable to use the same physical path for control of the distributed elements in lieu of a separate overlaid control network. This can be done by allocating a small portion of the bandwidth, usually referred to as a 'time slot', for the control information. Since the control information is embedded in the same signal path with the voice/data information, it is referred to as an 'embedded' control channel.

The present invention contemplates an embedded control mechanism that can be used to transfer control information transparently between two entities, one of which is typically (but not necessarily) a control element. The simplicity and flexibility of the technique arises from the use of additional channel bandwidth to transmit control information. The technique allows the designer to greatly reduce the complexity of the receiving devices.

The format of control information communicated on such a channel and the techniques for transmitting and receiving such information are the subject of this invention. A unique aspect of this technique is that it may be used interchangeably for both ROC and MOC devices and is equally efficient in either mode. An additional advantage is that new elements may be added to the architecture or existing elements may be upgraded from ROC to MOC (or vice versa) without having to anticipate in advance the ratio of ROC and MOC elements that will be implemented.

Every unit of control information transferred by the mechanism of this invention is accompanied by control data which specifies how the information is to be handled by the receiving element. This control data may contain several fields which specify: 1) whether the channel is idle or carrying valid information; 2) the address or 'register number' into which the information will be deposited at the receiving element; 3) whether the information is urgent in nature; and 4) error detection information such as parity. Other fields could exist in the control data if needed for specific application; as, for example, if the urgency of the information is to be prioritized, additional bits could be provided in the field to establish a priority rating. The above four mentioned fields will be sufficient for a large class of applications and shall therefore be used for illustration purposes in the detailed description, which follows hereinafter.

It is not necessary that the control data and the information be carried in the same channel. They may be carried in separate channels, or even on separate physical media, as long as their association is preserved. For the sake of simplicity, it will be assumed that both are carried in the same channel in concatenated fashion. A channel may contain bits of information representing the following: a valid data indicator comprising a single bit indicating data valid or not valid; an interrupt indicator which may comprise a single bit alerting a microprocessor to interrupt and service the message contained in the channel; a parity bit for providing error detection; a field of bits representing an address designating a destination register or memory address in an intelligent device; and an information data field for transparently carrying the data between the system elements.

In ROC applications, the address field may be used by the transmitting element, to randomly direct information to control registers of a controlled element. Likewise, the controlled element may return information, upon request or autonomously, to tee controlling element in randomly addressed fashion. Alternatively a controlled element could routinely transmit status information to its controller by continually, or periodically, transmitting the information in all of its registers sequentially. The information could then be received and deposited in 'shadow registers' in the memory of an intelligent controller where it could be referenced as needed by the controller. In the event of some unusual or otherwise significant event, the controlled element could activate an interrupt field when transmitting the register containing the pertinent information. When received by the controller, the interrupt field could be used to invoke the interrupt capability of the microprocessor or other intelligent device. If the event was particularly critical, the information could, in fact, was particularly suspend or supersede the normal sequential or periodic transmission of routine status information by the controlled element.

MOC applications are accommodated by virtue of the transparent delivery of up to $2^n$ message characters, where n equals the number of address bits used. By implementing a message transfer protocol which segments and reassembles messages greater than m$\times 2^n$ bits in length, where m equals the number of bits in the information data field, application software may transmit messages of any length transparently. Message segments could be brought to the attention of the receiving processor by activating the interrupt field of the last character transmitted in each segment. This allows the receiving processor to efficiently handle messages on a segment basis rather than a costly character-by-character basis.

A key aspect of this invention is that no sequence information need be retained by the receiving elements, since the information is always transmitted with explicit address tags. In an intelligent controller, a specific region of memory should be mapped to each channel carrying distributed control information. The receive logic of the controller, upon receiving the information, can easily derive the memory address into which the information should be deposited by concatenation of a base address, channel number (or time slot) on which the information was received, and the address tag received with the information. The received information can then be deposited in the memory by means of simplified direct memory access (DMA), transparent to the processor, unless an interrupt is indicated in the interrupt field. It is this simplifying feature that makes this technique particularly attractive as an alternative to conventional approaches involving replicated serial communication devices and DMA controllers in distributed systems with a centralized controller and a large number of replicated elements.

A primary objective of the present invention is to provide a distributed control system which does not need a separate overlay of control paths.

Another objective of the present invention is to provide a distributed control system that is compatible for use with both ROC and MOC devices.

Another objective of the present invention is to provide a distributed control system that is operative with any combination of ROC and MOC devices.

Another objective of the present invention is to provide a system which is transparent to the information transmitted between elements.

Another objective of the present invention is to provide duplex communication of control signals between elements.

The above and other objectives and advantages of the invention will become more apparent upon reading the description of the invention in connection with the drawings described below.

DESCRIPTION OF THE PREFERRED EMBODIMENT

Figure 1:
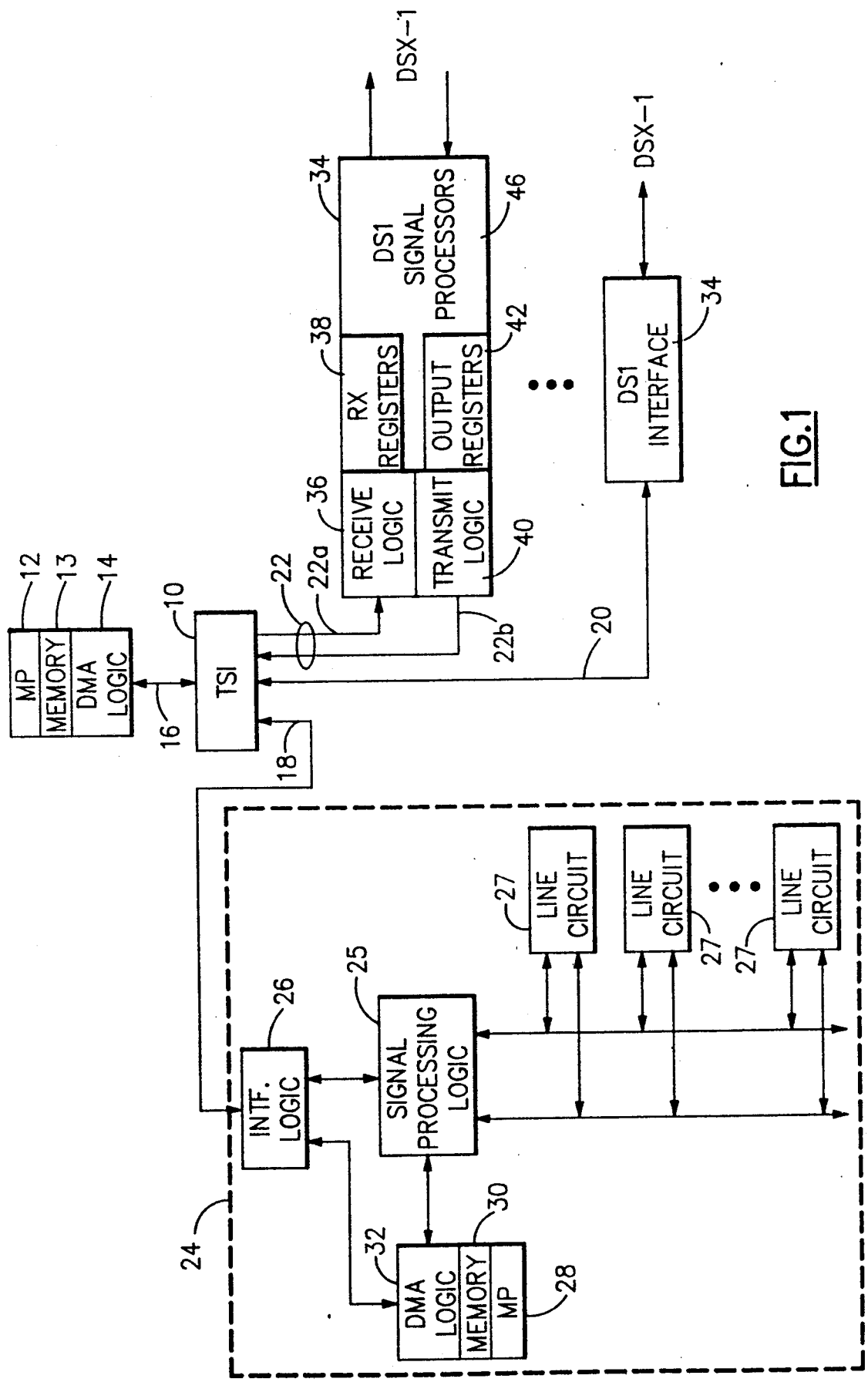
FIG. 1 is a block diagram illustrating a distributed control system incorporating the embedded control technique of the present invention.

FIG. 1 illustrates a distributed control system incorporating the embedded control technique of the present invention. The control system of FIG. 1 diagramatically illustrates a device that could be used in telecommunications. A time-slot interchanger (TSI) 10 is at the center of the system for distributing speech, data and control information. A microprocessor 12 is shown having a plurality of registers which are mapped into memory 13 by DMA logic 14. The microprocessor is used to control the system and to send control information to the various system elements. The registers which reside in memory 13 are, in effect, shadow registers to receive data from the system elements and temporarily hold such data until a time when the microprocessor can process the data.

A bidirectional serial data link 1 connects the microprocessor 12 to the time-slot interchanger 10. Link 16 comprises two unidirectional serial paths for transmitting and receiving information.

The time-slot interchanger 10 is connected to a number of system elements by serial data links 18, 20 and 22. Each of the serial data links comprises two paths for unidirectionally transmitting and receiving information. Link 22 is shown as two separate paths 22a and 22b for the purpose of simplifying the description of the invention. Serial data link 18 connects the time-slot interchanger 10 with an intelligent terminal 24, which may be a control element similar to microprocessor 12 used as shown in conjunction with a line shelf used in a telephone system. Intelligent terminal 24 may be connected to additional system elements, not shown. Intelligent terminal 24 includes interface logic 26 for separating control information from voice and data signals which are distributed to line circuits 27 via signal processing logic 25 and a microcomputer including a microprocessor 28, memory 30 and a direct memory access (logic) 32.

The time-slot interchanger 10 is further connected by data links 20 and 22 to non-intelligent elements 34 such as DS1 terminals of a telecommunications system. Link 22 is shown having path 22a connected to a receive logic circuit 36, which distributes control information based on an address, to receive registers 38, which may be embedded in various application specific integrated circuits (ASICs). In the present embodiment, the receive logic 36, receive register 38, transmit logic 40, output register 42, and most of the DSI signal processing 46 are implemented in one such ASIC. It is to be understood that the number of receive registers 38 provided within each ASIC may vary, depending on the complexity of the ASIC and the control requirements. Each ASIC is provided with one or more output registers 42 for assembling information to be returned to microprocessor 12. The output registers 42 are connected to path 22b of link 22 via transmit logic 40 for connection to microprocessor 12 through TSI 10 and link 16.

The ASICs include an addressing and timing means which may be used to initiate reading of the output registers 42 during a particular period of time. The address means may comprise counters connected to receive a clock signal, said counters being adapted to provide an output for enabling the reading of the registers 42 at a particular address or time slot, on serial data link 22, associated with a particular ASIC or a register within the ASIC.

As previously mentioned, serial data links 16, 18, 20 and 22 include two paths for transmitting and receiving serial information. These serial data links normally carry time multiplexed voice and/or data information and are uniquely used in the present invention to distribute control information between the elements of a system. The control information may include alarm, provisioning and control commands between a control element such as microprocessor 12 and the various systems elements such as the intelligent terminal 24 or the DSI terminals 34.

The serial data links are time-division multiplexed into a number of time slots as, for example, thirty-two sequential time slots representing a frame of information, with said frame being repeated. These individual time slots are commonly referred to as channels. The present invention relates to the use of one or more of these channels to convey alarm, provisioning or control commands for a distributed control system. Thus, the control mechanism of the present invention is embedded in the data paths used to transport the voice and data information of the telecommunications system.

The time slots, or channels, of the system in which the present invention may be used, include data or information in the form of words which may have any arbitrary length; however, a length of 16 bits is used in the described embodiment. The control mechanism of the present invention is called a VI Channel, primarily because one bit of data contained within the byte is designated a V bit, or valid data indicator, while another bit is designated an I bit, or interrupt indicator.

Figure 2:
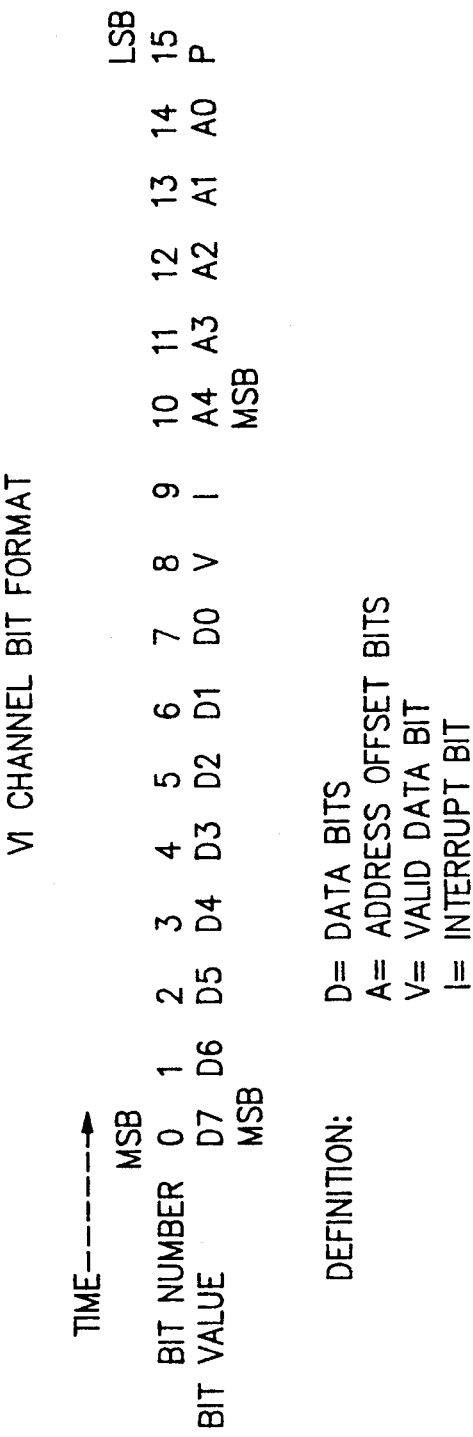
FIG. 2 illustrates the bit format used in the control mechanism of the present invention.

The VI Channel bit format is illustrated in FIG. 2, where the 16 bits are shown as being numbered from 0 to 15, with 0 being the most significant bit and 15 the least significant bit. The word of data is divided into two fields, primarily an information field, including bits 0 through 7 which provide eight data bits and a control field comprising bits 8 through 15, which includes the valid data bit V, the interrupt bit I, a parity bit P and five address bits A0 to A4 found in bits 10 through 14, with bit A4 being in bit position 10 and being the most significant bit.

The valid data indicator, bit V, indicates whether the VI Channel is idle or is carrying valid data which must be acted upon. The interrupt indicator I indicates that the channel is signaling that the information field contains information of an urgent nature which should be acted upon immediately. The parity bit P is a one-bit error detection field which is established by the transmitting element and evaluated by the receiving element to verify the integrity of the entire byte. The address field A0 to A4 contains a unique address of a register in an ROC device or of a location in a memory of a microcomputer, such as memory 30 in the intelligent terminal 24. For purposes of illustration, the address field is shown as being five bits in length; however, any length could be utilized as long as it is compatible with the total available word length and the bits of information needed in the information field. In a similar manner, the information field is shown as being eight bits long; however, any other convenient length could be used that is compatible with total word length.

The VI Channel is the alarm, provisioning and communications channel between the controller and the various elements of the system. The VI Channel format is suitable for both message communication between intelligent elements, such as control elements, and register-oriented control for non-intelligent elements, such as the DSI terminals. The format described uses half of the bandwidth for control and synchronization purposes, while the remainder of the bandwidth is used for data or information transfer. The format of the VI Channel is completely transparent to the other channels of the serial data link and therefore does not interfere with the normal voice or data transmission.

The V bit indicates that the information being transmitted is valid, while the I bit is used as an interrupt for high-priority information. If the V bit is not set, the contents of the VI Channel are discarded and are not used by either the intelligent terminal 24 or the non-intelligent DS1 terminals 34. In like manner, if a parity error exists, the contents of the VI Channel will also be ignored.

The I bit in the VI Channel is used when messages are being sent to an intelligent terminal, so that the microprocessor may be interrupted to immediately act upon the message being sent.

A key feature of the VI Channel mechanism is that no sequence information need be retained by the receiving element, since the information is always transmitted with explicit address bits. In an intelligent controller, a specific region of the memory is mapped to each channel carrying distributed control information. The receiver logic of the controller, upon receiving the information, can easily derive the memory address into which the information should be deposited by concatenation of a base address, channel number on which the information was received, and the address bits received with the information. The received information is deposited in memory such as 13 or 30 by means of the direct memory access (DMA) 14 or 32 respectively in a manner that is entirely transparent to the processor, unless an interrupt (I bit) is set, in which case the processor will be interrupted at the first appropriate time to process the data being received on the VI Channel. Note that the DMA mechanism referred to here is not the conventional DMA controller which must be capable of sequencing memory operations by means of internal memory address counters. The DMA logic used with this invention is greatly simplified, requiring no internal address counters or state memory. It is therefore possible to implement DMA on a plurality of channels inexpensively and in much less physical space. Thus, the simplified mechanism of the present invention makes it particularly attractive as an alternative to conventional approaches, involving replicated serial communication devices and DMA controllers, in distributed control systems with a centralized controller and a large number of replicated elements.

For an understanding of the more detailed operation of the present invention, reference should be made to FIG. 1. Microprocessor 12 generates a number of messages or commands for various system elements. These commands are inserted in VI Channels in serial data link 16, with each channel containing a word as shown in FIG. 2, namely the information field and a control field having an address and the V, I and P bits. It is contemplated that serial data link 16 will contain a plurality of VI Channels in each frame for distributing control information. The TSI 10 receives the VI Channels from link 16 and performs a grooming function on the VI Channels along with the other voice/data channels, distributing them to a plurality of serial data links, such as 18, 20 and 22, in accordance with its previously programmed channel connection map. One or more VI Channels may be serially transmitted on the transmission path 22a of serial data link 22, where the logic element 36 decodes the address and directs the byte to a register 38 in accordance with the address contained within the VI Channel word. If the VI Channel does not have the V bit set, logic element 36 will ignore the word and will not accept the VI Channel. In the transmit direction, the I bit is not necessary when dealing with non-intelligent system elements, since the VI Channel byte is immediately loaded into a register if valid information is indicated and the ASIC immediately responds to the command.

When a message is sent to intelligent terminal 24, the interface logic 26 will only accept the message when the V bit is set in the VI Channel word. A message may consist of a plurality of segments which are accumulated in memory 30 by microprocessor 28. Preferably the I bit will be set in the last character of each segment, so that the processor 28 will handle the message only after the complete segment is available, and not on a character-by-character basis.

Messages being returned to the microprocessor 12 require that the I bit be set if immediate action by the microprocessor is desired. Messages received on the VI Channels by the microprocessor 12 will be directed to shadow registers residing in memory 13, where the messages will be stored until the microprocessor polls the register at its convenience for receiving the stored messages. However, upon receipt of a message with the I bit set, the microprocessor will be interrupted at the appropriate time to act upon such message.

The various ASICs may have data to transmit back to the microprocessor 12, and this data is loaded in the output registers 42. The data could relate to various signal status conditions or could be merely a reflection of the received command, so that the microprocessor can verify receipt of its last command. Counters are provided with a clock signal, so that an address may be generated. The counter provides an enable signal during the appropriate time slot of the VI Channel, so that the output register 42 for the particular ASIC may be read to the serial data link 22 to transmit the return or reflected information in the appropriate channel and with an appropriate address.

Thus, it can be seen that all communications between system elements can be provided through the use of VI Channels. Such communications include alarm, provisioning and command functions. The VI Channel mechanism provides a means to communicate between system elements in a distributed control system, which means does not need a separate overlay of control paths. The VI Channel mechanism is uniquely compatible with both ROC and MOC devices, and more particularly, with any combination of such devices. The command information is distributed transparently between system elements and does not interfere with normal voice or data communication.

What is claimed is:

1. A method for controlling an electronic system having at least two functional elements, at least one being intelligent and at least one non-intelligent, wherein information is normally conveyed between said elements in time slots of a time-division multiplexed data link, said method comprising the steps of:

generating a control message in one of said elements, including formatting said control message in a format compatible with both types of elements;

inserting said control message in a predetermined time slot of said data link; and reading said control message from said data link by another of said elements during said time slot, whereby a control message may be transmitted in a predetermined time slot of the same data link used to convey information and one control message format can be used and transmitted on the data link for both types of elements.

2. A method as described in claim 1, wherein the message is transmitted transparently between system elements.

3. A method as described in claim 1, wherein said data link is a duplex data link having two paths for conveying information in two directions, said method additional comprising the steps of:

generating a reply in said another of said elements;
inserting said reply in a predetermined time slot of the path of the data link that conveys information in a direction opposite from the path from which the message was read; and reading said reply from said data link by said one of said elements during the predetermined time slot in which the reply was inserted.

4. A method as described in claim 1, wherein the generating step includes a step of formatting said message to include command data and control data, said control data including an address of a register to receive said message, and said reading step is performed by the receiving register.

5. A method for controlling an electronic system having at least two functional elements, wherein information is normally conveyed between said elements in time slots of a time-division multiplexed data link, said method comprising the steps of:

generating a message in one of said elements, said message being formatted to include a plurality of command data bits, a plurality of address bits for an address of an element to receive said message, a message valid bit, an interrupt bit, and a parity bit, the message valid bit, when set, indicating that a valid message is being transmitted, as opposed to random idle bits, and the interrupt bit, when set, identifying the message as being urgent and one that should be promptly acted upon;

inserting said message in a predetermined time slot of said data link; and reading said message from said data link by an element having the address designated by the address bits during said time slot, whereby a message may be transmitted in a predetermined time slot of the same data link used to convey information.

6. A method as described in claim 5, wherein the addressed element reads only messages wherein the message valid bit has been set.

7. A method as described in claim 6, wherein the system includes intelligent elements, each having a microprocessor, adapted to receive message-oriented control, and non-intelligent elements, each having a register adapted to receive register-oriented control, and addressed intelligent elements interrupt said microprocessor to service said message only if the interrupt bit is set.

8. A method as described in claim 7, wherein the address bits are set to an address of a register in a non-intelligent element or to a storage location in a memory associated with a microprocessor in an intelligent element.

9. A method as described in claim 7, wherein addressed non-intelligent register-oriented control elements execute a read message immediately.

10. A method as described in claim 5, wherein the message is ignored if the parity bit is not in the proper condition.

11. A method as described in claim 1, wherein the system includes intelligent elements having message-oriented control, and non-intelligent elements having register-oriented control, wherein the message is generated in an intelligent control element, having a microprocessor for controlling the system.

12. A method as described in claim 11, wherein the control element generates a plurality of messages addressed to other system elements.

13. A method as described in claim 11, wherein said data link is a duplex data link having separate paths for conveying information in opposite directions between elements, said method additionally comprising the steps of:

generating return messages in elements other than the control element;

inserting said return messages in predetermined time slots of a data link path to convey information to said control element; and reading said return messages by said control element.

14. A method as described in claim 13, wherein the intelligent control element includes a number of shadow registers in which return messages are stored.

15. In an electronic system of the type having a plurality of functional elements comprising both intelligent terminals and non-intelligent terminals interconnected by at least one duplex time-division multiplexed serial data link for conveying information between said elements in time slots of said data link, the improvement comprising means for distributing control information between said elements in predetermined time slots of said data link, said control information being formatted to be readable by both types of terminals so that only one control information format is required, whereby control information is transmitted transparently between elements over a data link used to convey information.

16. A system as described in claim 15, wherein the information conveyed between elements comprises voice and data information.

17. In an electronic system of the type having a plurality of functional elements including intelligent terminals and non-intelligent terminals interconnected by least one duplex time-division multiplexed serial data link for conveying information between said elements in time slots of said data link, the improvement comprising means for distributing control information between said elements in predetermined time slots of said data link, said control information being formatted to be readable by both types of terminals and including a plurality of command data bits, a plurality of address bits of an address of a register or storage location in memory designated to receive the control information, a valid bit, an interrupt bit and a parity bit, wherein the valid bit, if set, indicates that valid control information is being sent in said time slot and that the time slot is not idle, and the interrupt bit, if set, indicates that the control information is of an urgent nature and should be acted upon immediately.

18. A system as described in claim 17, wherein the control information is formatted to include command data and control data, said control data including an address of a register or storage location in memory designated to receive the information on the receiving terminal.

19. A system as described in claim 17, wherein the designated terminal only receives the control information if the valid bit is set.

20. A system as described in claim 17, wherein the intelligent terminals include microprocessors which are interrupted to service the control information if the interrupt bit is set.

21. A distributed control communication system, comprising:

a control element, including a microprocessor for generating system control messages, said messages being generated in a format with a plurality of bits and a length that fits within the time slots of the time-division multiplexed serial data links, said format being readable by both said intelligent elements and said non-intelligent elements and including a plurality of command data bits, a plurality of address bits, a message valid bit, an interrupt bit, and a parity bit, said message valid bit, when set, indicating that a valid message is being transmitted and that the time slot is not idle, said interrupt bit, when set, indicating that an urgent message is being transmitted and must be acted upon immediately.

22. A system as described in claim 21, wherein the address bits are set to an address of a register in non-intelligent element or to a location in the memory of an intelligent element.

23. A system as described in claim 21, wherein the microprocessor in an intelligent element and in the control element will interrupt to service a message received by the element if the message has the interrupt bit set.

24. A system as described in claim 21, wherein the control element includes a plurality of registers into which the return messages are stored and the microprocessor services the return messages in the registers in a routine manner.

25. A distributed control communication system, comprising:

a control element, including a microprocessor for generating system control messages;

at least one intelligent element, including a microprocessor in a memory, and having message-oriented control;

at least one non-intelligent element, having register-oriented control;

a plurality of time-division multiplexed serial data links having first and second ends, each of said links being connected to one of said system elements at a first end of said link;

switch means connected to the second ends of said links, said time-division mulitplexed serial data links and said switch means being operative to convey information between said system elements in time slots of said time-division multiplexed serial data links; and means for distributing control messages from said control element to designated ones of said elements and to convey return messages from said designated ones of said elements to said control element in predetermined time slots of said data links, said control element generating said control messages in a format with a plurality of bits and a length that fits within a time slot of the time-division multiplexed serial data links, said format being readable by both said intelligent elements and said non-intelligent elements.

26. A system as described in claim 25, wherein said data links each comprise two separate paths for conveying information in opposite directions, and said means for distributing transmits messages from the control element on one path and transmits messages to the control element on the other path.

* * * * *